US010656877B2

(12) United States Patent
Franciosi et al.

(10) Patent No.: US 10,656,877 B2
(45) Date of Patent: May 19, 2020

(54) VIRTUAL STORAGE CONTROLLER

(71) Applicant: Nutanix, Inc., San Jose, CA (US)

(72) Inventors: Felipe Franciosi, San Jose, CA (US); Miao Cui, New York, NY (US)

(73) Assignee: NUTANIX, INC., San Jose, CA (US)

(*) Notice: Subject to any disclaimer, the term of this patent is extended or adjusted under 35 U.S.C. 154(b) by 124 days.

(21) Appl. No.: 15/831,744

(22) Filed: Dec. 5, 2017

(65) Prior Publication Data
US 2018/0157444 A1    Jun. 7, 2018

Related U.S. Application Data

(60) Provisional application No. 62/430,764, filed on Dec. 6, 2016.

(51) Int. Cl.
*G06F 9/455* (2018.01)
*G06F 3/06* (2006.01)

(52) U.S. Cl.
CPC ........... *G06F 3/0664* (2013.01); *G06F 3/067* (2013.01); *G06F 3/0607* (2013.01); *G06F 3/0613* (2013.01); *G06F 3/0661* (2013.01); *G06F 9/45533* (2013.01); *G06F 9/45558* (2013.01); *G06F 2009/45579* (2013.01)

(58) Field of Classification Search
None
See application file for complete search history.

(56) References Cited

U.S. PATENT DOCUMENTS 7,870,317 B2 * 1/2011 Suresh .................. G06F 3/061
710/74
8,549,518 B1 10/2013 Aron et al.
8,589,550 B1 * 11/2013 Faibish .................. G06F 3/067
707/E17.01

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Kenneth Tang
(74) *Attorney, Agent, or Firm* — Foley & Lardner LLP

(57) ABSTRACT

An exemplary embodiment disclosed herein is a method including a virtual storage controller receiving an input/output (I/O) command using a native drive communications protocol from a software application on a user virtual machine running on the host machine; determining whether a local service virtual machine is unresponsive to the virtual storage controller; translating the I/O command from the native drive communications protocol to an IP-based storage communications protocol to create a translated I/O command, in response to the local service virtual machine being unresponsive to the virtual storage controller; sending the translated I/O command to a remote service virtual machine, wherein the remote service virtual machine is configured to send the translated I/O command to a local storage and receive a response from the local storage; and receiving the response from the remote service virtual machine.

24 Claims, 9 Drawing Sheets

(56) References Cited

U.S. PATENT DOCUMENTS

| | | | | |
|---|---|---|---|---|
| 8,601,473 | B1* | 12/2013 | Aron | G06F 9/45533 |
| | | | | 718/1 |
| 8,850,130 | B1 | 9/2014 | Aron et al. | |
| 8,863,124 | B1* | 10/2014 | Aron | G06F 9/45533 |
| | | | | 709/223 |
| 8,874,954 | B1* | 10/2014 | Gupte | G06F 11/2028 |
| | | | | 714/1 |
| 9,772,866 | B1 | 9/2017 | Aron et al. | |
| 10,108,560 | B1* | 10/2018 | Lamb | G06F 3/0607 |
| 2004/0093607 | A1* | 5/2004 | Elliott | H04L 67/1097 |
| | | | | 719/326 |
| 2013/0238930 | A1* | 9/2013 | Umbehocker | G06F 11/2092 |
| | | | | 714/6.32 |
| 2015/0242232 | A1* | 8/2015 | Simoncelli | G06F 9/45558 |
| | | | | 718/1 |
| 2016/0359955 | A1* | 12/2016 | Gill | H04L 67/1097 |
| 2018/0039412 | A1* | 2/2018 | Singh | G06F 3/061 |
| 2018/0136957 | A1* | 5/2018 | Guo | H04L 63/0428 |
| 2019/0065064 | A1* | 2/2019 | Jin | G06F 11/14 |

OTHER PUBLICATIONS

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (3 Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Cano et al., (Curator: Self-Managing Storage for Enterprise Clusters), https://www.usenix.org/conference/nsdi17/, Mar. 27, 2017, pp. 1-16.

* cited by examiner

VIRTUAL STORAGE CONTROLLER

CROSS REFERENCE RELATED TO APPLICATION

This application claims priority to U.S. Provisional Application 62/430,764 filed on Dec. 6, 2016, incorporated by reference in its entirety. U.S. Pat. No. 8,601,473 filed on Aug. 10, 2011 and U.S. patent application Ser. No. 14/938,726 filed Nov. 11, 2015, are herein incorporated by reference in their entirety.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

SUMMARY

Aspects of the present disclosure relate generally to a virtualization environment, and more particularly to an architecture for implementing a virtual storage controller in a virtualization environment.

An illustrative embodiment disclosed herein is a method comprising receiving, by a virtual storage controller running on a host machine, an input/output (I/O) command using a native drive communications protocol from a software application on a user virtual machine running on the host machine; determining, by the virtual storage controller, whether a local service virtual machine is unresponsive to the virtual storage controller; translating, by the virtual storage controller, the I/O command from the native drive communications protocol to an IP-based storage communications protocol to create a translated I/O command, in response to the local service virtual machine being unresponsive to the virtual storage controller; sending, by the virtual storage controller, the translated I/O command to a remote service virtual machine, wherein the remote service virtual machine is configured to send the translated I/O command to a local storage and receive a response from the local storage; and receiving, by the virtual storage controller, the response from the remote service virtual machine.

Another illustrative embodiment disclosed herein is a system comprising a plurality of nodes comprising a first node and a second node; a network configured to connect the plurality of nodes; and a plurality of network storage devices, wherein the first node comprises a first hypervisor; a plurality of first user virtual machines; a first local storage configured to be accessed by the plurality of first user virtual machines; a first service virtual machine configured to manage access by the plurality of first user virtual machines to the plurality of network storage devices and the first local storage; and a first virtual storage controller, wherein the second node comprises a second hypervisor; a plurality of second user virtual machines; a second local storage configured to be accessed by the plurality of second user virtual machines; a second service virtual machine configured to manage access by the plurality of second user virtual machines to the plurality of network storage devices and the second local storage; and a second virtual storage controller, and wherein the first virtual storage controller is configured to receive an I/O command from a software application on a single user virtual machine of the plurality of first user virtual machines; determine whether the first service virtual machine is unresponsive to the first virtual storage controller; translate the I/O command from a native drive communications protocol to an IP-based storage communications protocol to create a translated I/O command, in response to the first service virtual machine being unresponsive to the first virtual storage controller; send the translated I/O command to the second service virtual machine, wherein the second service virtual machine is configured to send the translated I/O command to the second local storage and receive a response from the second local storage and receive the response from the second service virtual machine.

Another illustrative embodiment disclosed herein is a non-transitory computer-readable storage medium having instructions stored thereon that, upon execution by a computing device, causes the computing device to perform operations comprising receiving, by a virtual storage controller running on a host machine, an I/O command using a native drive communications protocol from a software application on a user virtual machine running on the host machine; determining, by the virtual storage controller, whether a local service virtual machine is unresponsive to the virtual storage controller; translating, by the virtual storage controller, the I/O command from the native drive communications protocol to an IP-based storage communications protocol to create a translated I/O command, in response to the local service virtual machine being unresponsive to the virtual storage controller; sending, by the virtual storage controller, the translated I/O command to a remote service virtual machine, wherein the remote service virtual machine is configured to send the translated I/O command to a local storage and receive a response from the local storage; and receiving, by the virtual storage controller, the response from the remote service virtual machine.

DETAILED DESCRIPTION

Figure 1A:
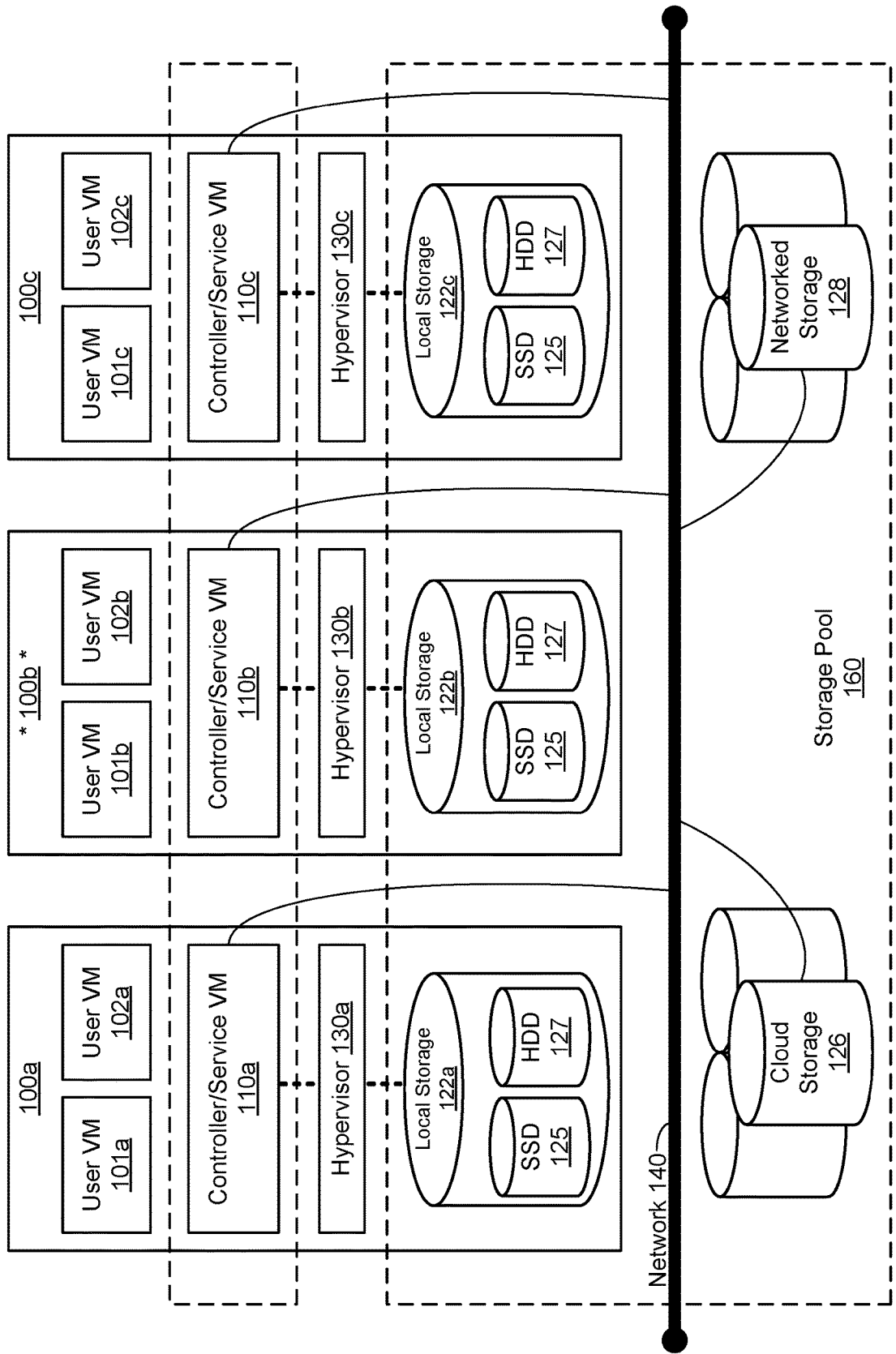
FIG. 1A illustrates a clustered virtualization environment.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

In particular embodiments, a virtual storage controller may allow a user virtual machine to send and receive I/O commands in a native drive communications protocol, such as a direct-attached storage protocol. In some embodiments, a virtual storage controller may detect that a connection to a local controller/service virtual machine has failed and send and receive I/O commands over a network to or from a remote controller/service virtual machine.

FIG. 1A illustrates a clustered virtualization environment according to particular embodiments. The architecture of FIG. 1A can be implemented for a distributed platform that contains multiple host machines 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits local storage 122a-c that is within or directly attached to the server and/or appliance to be managed as part of storage pool 160. Examples of such storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM (CVM) 110 to be used by a user VM. In some embodiments, the vDisk is exposed via iSCSI ("internet small computer system interface") or NFS ("network file system") and is mounted as a virtual disk on the user VM.

Each host machine 100a-c runs virtualization software, such as VMWARE ESX(I), MICROSOFT HYPER-V, or REDHAT KVM. The virtualization software includes hypervisor 130a-c to manage the interactions between the underlying hardware and the one or more user VMs 101a, 102a, 101b, 102b, 101c, and 102c that run client software. Though not depicted in FIG. 1A, a hypervisor may connect to network 140. In particular embodiments, a host machine 100 may be a physical hardware computing device; in particular embodiments, a host machine 100 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 100, and work together to form a distributed system 110 that manages all the storage resources, including local storage 122, networked storage 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 100b, as indicated by the asterisks, may be a leader node. A leader node may have a software component designated to perform operations of the leader. For example, CVM 110b on host machine 100b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 101a-c and 102a-c. These disks are virtual, since they are implemented by the software running inside CVMs 110a-c. Thus, to user VMs 101a-c and 102a-c, CVMs 110a-c appear to be exporting a clustered storage appliance that contains some disks. All user data (including the operating system) in the user VMs 101a-c and 102a-c reside on these virtual disks.

Significant performance advantages can be gained by allowing the virtualization system to access and utilize local storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
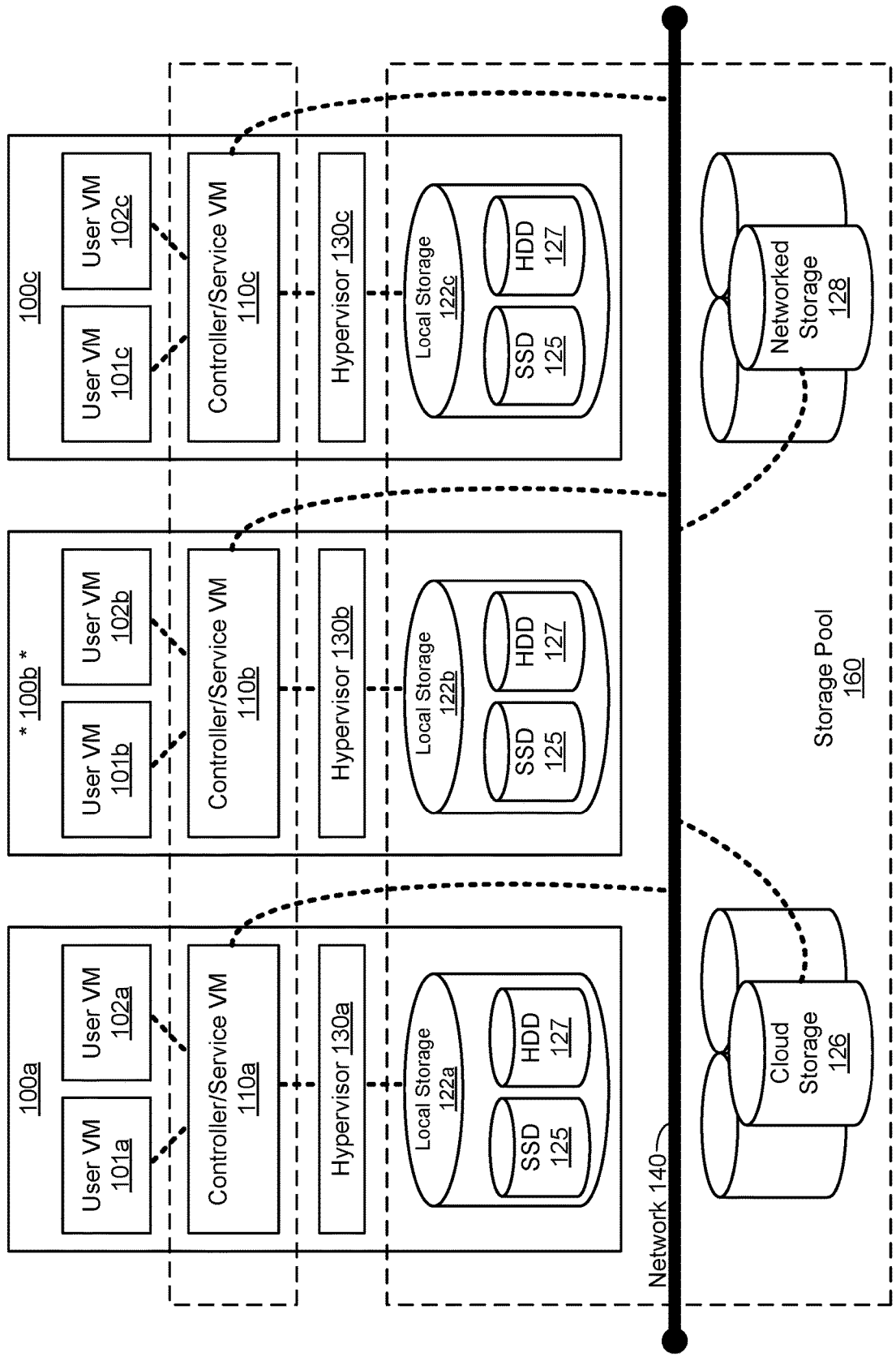
FIG. 1B illustrates data flow within a clustered virtualization environment.

FIG. 1B illustrates data flow within an example clustered virtualization environment according to particular embodiments. As described above, one or more user VMs and a CVM may run on each host machine 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 100a, by connecting via network 140 to cloud storage 126 or networked storage 128, or by connecting via network 140 to local storage 122b-c within another host machine 100b-c (e.g., via connecting to another CVM 110b or 110c). In particular embodiments, any suitable computing system 700 may be used to implement a host machine 100.

Figure 2A:
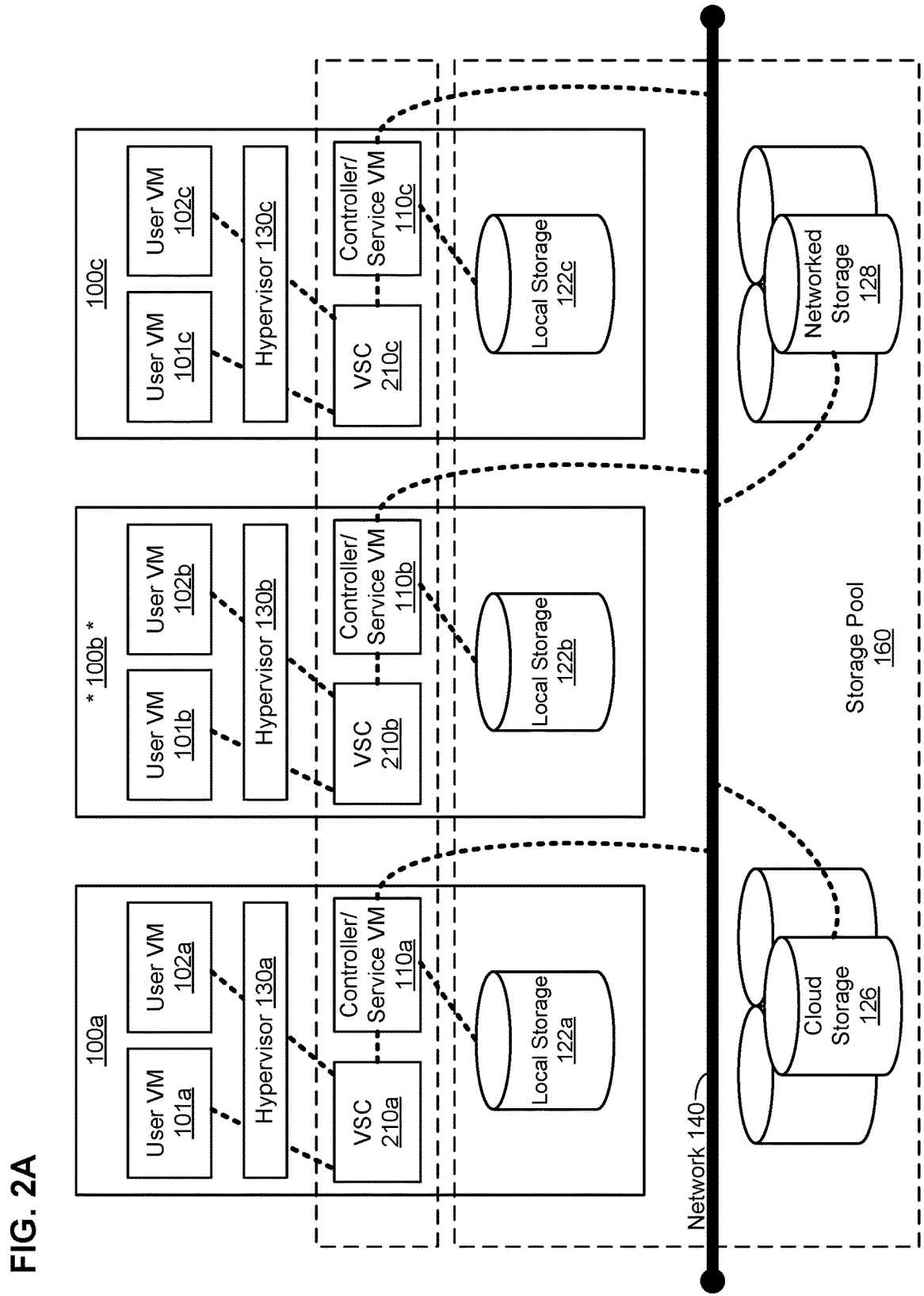
FIG. 2A illustrates an example implementation of a virtual storage controller.
Figure 2B:
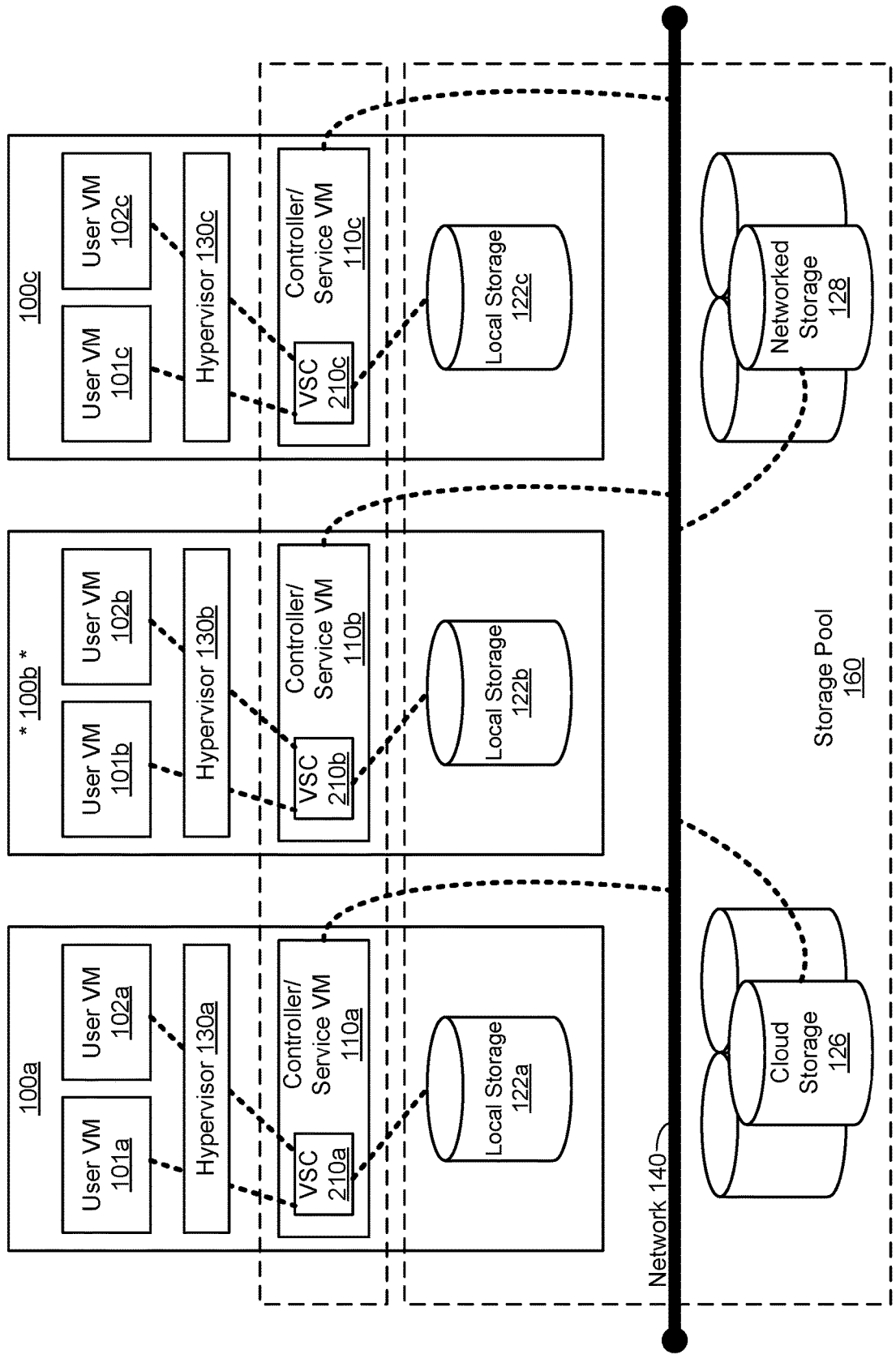
FIG. 2B illustrates an example implementation of a virtual storage controller.

FIGS. 2A and 2B illustrate an example implementation of a virtual storage controller. In particular embodiments, each user VM running on a host machine may have access to a vDisk. A vDisk may be software that presents itself to a user VM as a physical storage device. A user VM may interact with a vDisk by sending I/O commands to the vDisk, which may appear to a user VM as a contiguous storage area. Although a vDisk may appear to a user VM as a contiguous storage area, a vDisk may utilize one or more physical storage devices for data storage. For example, a vDisk may utilize local storage 122 for data storage.

In particular embodiments, I/O commands may be sent and received in conformity with a communications protocol (e.g., standards that may establish data formats, address formats, address mapping, routing, detection of transmission errors, acknowledgments of receipt, etc.). In some embodiments, a communications protocol may be a local storage protocol for communicating with a storage device directly attached to the computer accessing it or an Internet Protocol (IP)-based storage communications protocol (e.g., a protocol for communicating with storage devices over IP networks, such as a LAN, WAN, or the internet). As an example and not by way of limitation, a local storage protocol may include the Small Computer System Interface (SCSI) protocol, the Serial Attached SCSI (SAS) protocol, the AT Attachment (ATA) protocol, the Parallel ATA (PATA) protocol, the Serial ATA (SATA) protocol, the Serial Bus Protocol 2 (SBP-2), or any other local storage protocol. In some embodiments, direct-attached storage may be connected directly to a computer through a host bus adapter (HBA), with no intervening network device (e.g., a hub, switch, router, etc.). As an example and not by way of limitation, an IP-based storage communications protocol may include the Internet SCSI (iSCSI) protocol, the Network File System (NFS) protocol, the Server Message Block (SMB) protocol, the HADOOP Distributed File System (HDFS) protocol, or any other IP-based storage protocol. In some embodiments, an IP-based storage communications protocol may map a local storage protocol to a network protocol (e.g., a protocol specifying how data may be packetized, addressed, transmitted, or routed through a network). For example, the iSCSI protocol may map the SCSI protocol over the TCP/IP protocol. In some embodiments, a communications protocol may be a native drive communications protocol (e.g., a communications protocol that may be used to communicate directly with a storage device without the need for an intervening controller). For example, a native drive communications protocol for I/O communications with local storage 122a may be a local storage protocol. In this example, if a DAS device uses the SCSI communications protocol natively, then the native drive communications protocol may be the SCSI communications protocol.

In particular embodiments, a user VM running on a host machine may interact with a VSC as if it were a DAS controller within the host machine. For example, user VMs 101a-c may interact with VSC 210a-c as a DAS controller for host machines 100a-c, respectively. In some embodiments, the VSC may appear to user VMs within a host machine as a direct-attached storage controller. In some embodiments, user VMs and a VSC may communicate through a hypervisor, a controller/service VM, or communicate directly.

In particular embodiments, a user VM may communicate with a VSC using a native drive communications protocol (e.g., the communications protocol used by DAS). For example, VSC 210a may function as a direct-attached storage controller and present a virtual storage controller to user VMs 101a and 102a. User VMs 101a may perform I/O operations by communicating with VSC 210a as if it were a direct-attached storage controller (e.g., by sending I/O commands to VSC 210a, by receiving data from VSC 210a, etc.).

In particular embodiments, a VSC may be a separate module from a controller/service VM, as illustrated in FIG. 2A. In such embodiments, user VMs may communicate with a VSC, which may communicate with a controller/service VM, which may communicate with DAS. Additionally or alternatively, embodiments that feature a VSC as a separate module may be configured in any suitable communicative manner. For example, VSC 210a may be able to communicate directly to local storage 122a and bypass controller/service VM 110a. In particular embodiments, a VSC may be incorporated into a controller/service VM, as illustrated in FIG. 2B. Although FIGS. 2A and 2B depict particular configurations of a VSC, this disclosure contemplates any suitable configuration. For example, a VSC may be incorporated into a hypervisor.

Figure 3:
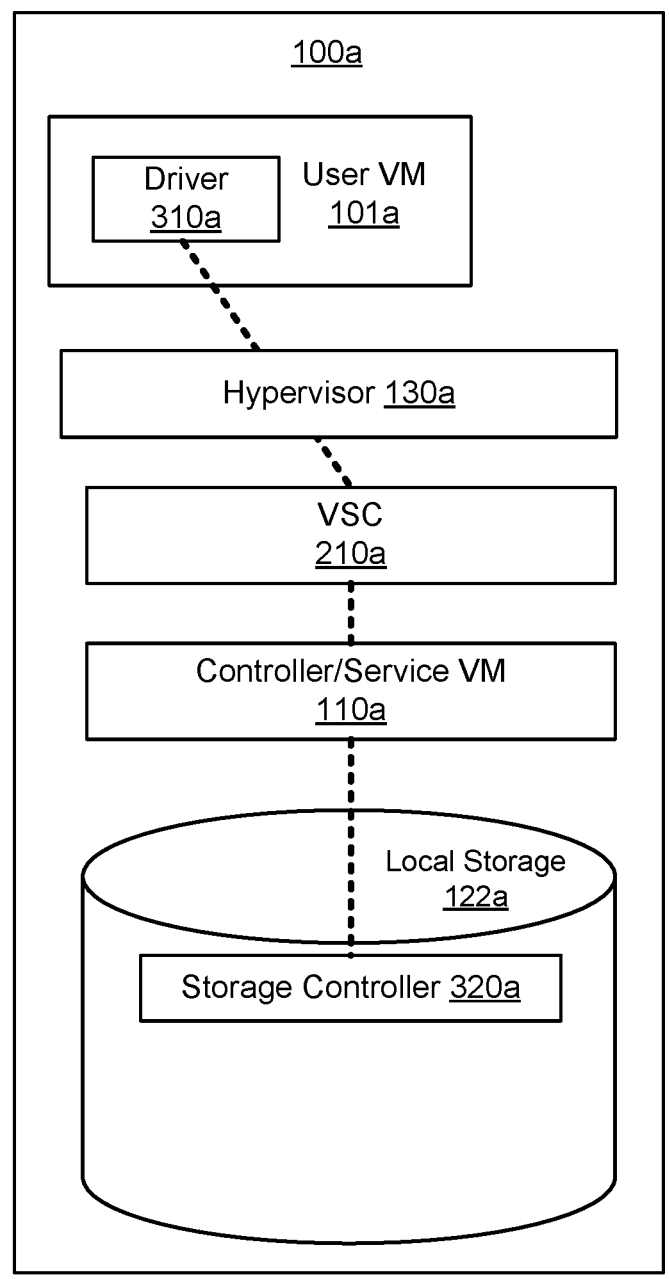
FIG. 3 illustrates data flow within an example host machine.

FIG. 3 illustrates data flow within an example host machine. In particular embodiments, user VM 101a may include driver 310a. Driver 310a may be a device driver (e.g., a software interface enabling an operating system or other software applications to access hardware functions by abstracting hardware-specific detail) for interfacing with storage devices.

In particular embodiments, VSC 210a may present as a DAS controller to user VM 101a. When user VM 101a accesses storage via VSC 210a, user VM 101a may send and receive I/O commands in a native drive communications protocol (e.g., user VM 101a may send and receive I/O commands in the communications protocol used by storage controller 320a). In some embodiments, user VM 101a and VSC 210a may interact through hypervisor 130a or user VM 101a may interact with VSC 210a via a pass-through (e.g., hypervisor may allow communications between user VM 101a and VSC 210a to pass through).

In particular embodiments, VSC 210a may include a device driver for interfacing with local storage 122a. A device driver may allow VSC 210a to access and communicate with storage controller 320a of local storage 122a. Storage controller 320a may, as an example and not by way of limitation, be an electrical component or hardware adapter that connects to local storage 122a and may receive I/O commands from a driver and send or receive I/O commands to storages devices in local storage 122a. As an example and not by way of limitation, storage controller 320a may be a SCSI controller or an Integrated Drive Electronics (IDE) disk controller. In some embodiments, a VSC may act as a pass-through (e.g., VSC may allow I/O commands between a user VM and a controller/service VM or DAS to pass through).

In some embodiments, an I/O command may be a read command. As an example and not by way of limitation, an operating system or software application running on user VM 101a may send a read command to VSC 210a by using driver 310a. VSC 210a may receive the read command and send a read command to storage controller 320a (e.g., by using a driver). Storage controller 320a may attempt to retrieve data corresponding to the read command. Storage controller 320a may send results to VSC 210a. The results may be the data corresponding to the read command (e.g., if retrieval is successful), an error message (e.g., if retrieval is unsuccessful), sending metadata corresponding to the read command, etc.

In particular embodiments, an I/O command may be a write command. As an example and not by way of limitation, an operating system or software application running on user VM 101a may send a write command to VSC 210a by using driver 310a. VSC 210a may receive the write command and send a write command to storage controller 320a. Storage controller 320a may attempt to write data corresponding to the write command to a storage device. Storage controller 320a may send results to VSC 210a. The results may be the confirmation of successful writing (e.g., if writing the data is successful), an error message (e.g., if writing is unsuccessful), sending metadata corresponding to the write command, etc.

Although particular I/O commands may be described, this disclosure contemplates any suitable I/O command. As an example, an I/O command may be a command to test whether a storage device is ready, format a storage device, read block limits for a storage device, reassign blocks for a storage device, verify data, copy data, erase data, determine or retrieve diagnostic data for a storage device, verify data integrity via data on a storage device, retrieve information about a storage device (e.g., retrieve buffer capacity), initiate repair, overwrite data, encrypt data, or any other suitable I/O command.

Figure 4:
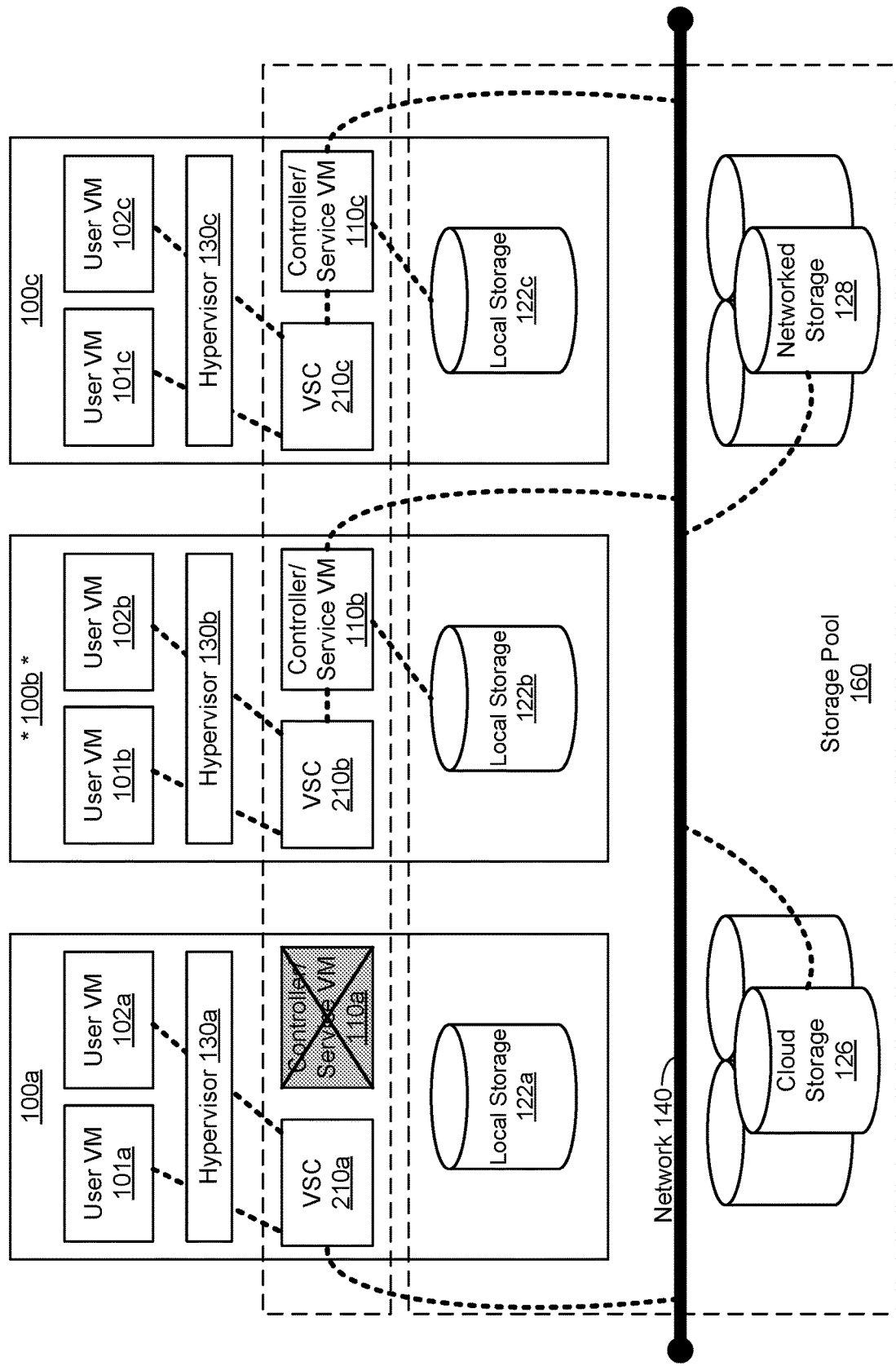
FIG. 4 illustrates an example failover scenario within an example clustered virtualization environment.

FIG. 4 illustrates an example failover scenario within an example clustered virtualization environment. As shown in FIG. 4, controller/service VM 110a may be unresponsive. In connection with monitoring and detecting unresponsiveness of controller/service VM 110a, particular embodiments may utilize one or more systems, components, elements, functions, methods, operations, or steps disclosed in U.S. patent application Ser. No. 14/938,726, entitled "Connection Management" and filed 11 Nov. 2015, which is incorporated herein by reference.

In particular embodiments, when a VSC on a host machine with an unresponsive local controller/service VM performs I/O operations, the VSC may communicate with a remote controller/service VM. For example, VSC 210a may be unable to communicate with controller/service VM 110a. VSC 210a may instead communicate with a remote controller/service VM (e.g., Controller Service VM 110b or 110c) via network 140. In some embodiments, VSC 210a may translate an I/O command received in a native drive communications protocol into an I/O command in an IP-based storage communications protocol. For example, VSC 210a may receive an I/O command from user VM 101a in the SCSI communications protocol. VSC 210a may embed the I/O command in or translate the I/O command to an I/O command in the iSCSI communications protocol to send the I/O command via network 140. In some embodiments, VSC 210a may, responsive to detecting that a local controller/service VM is unresponsive, present itself as a virtual storage controller to local user VMs that allows user VMs to send or receive I/O communications in an IP-based storage communications protocol.

Figure 5:
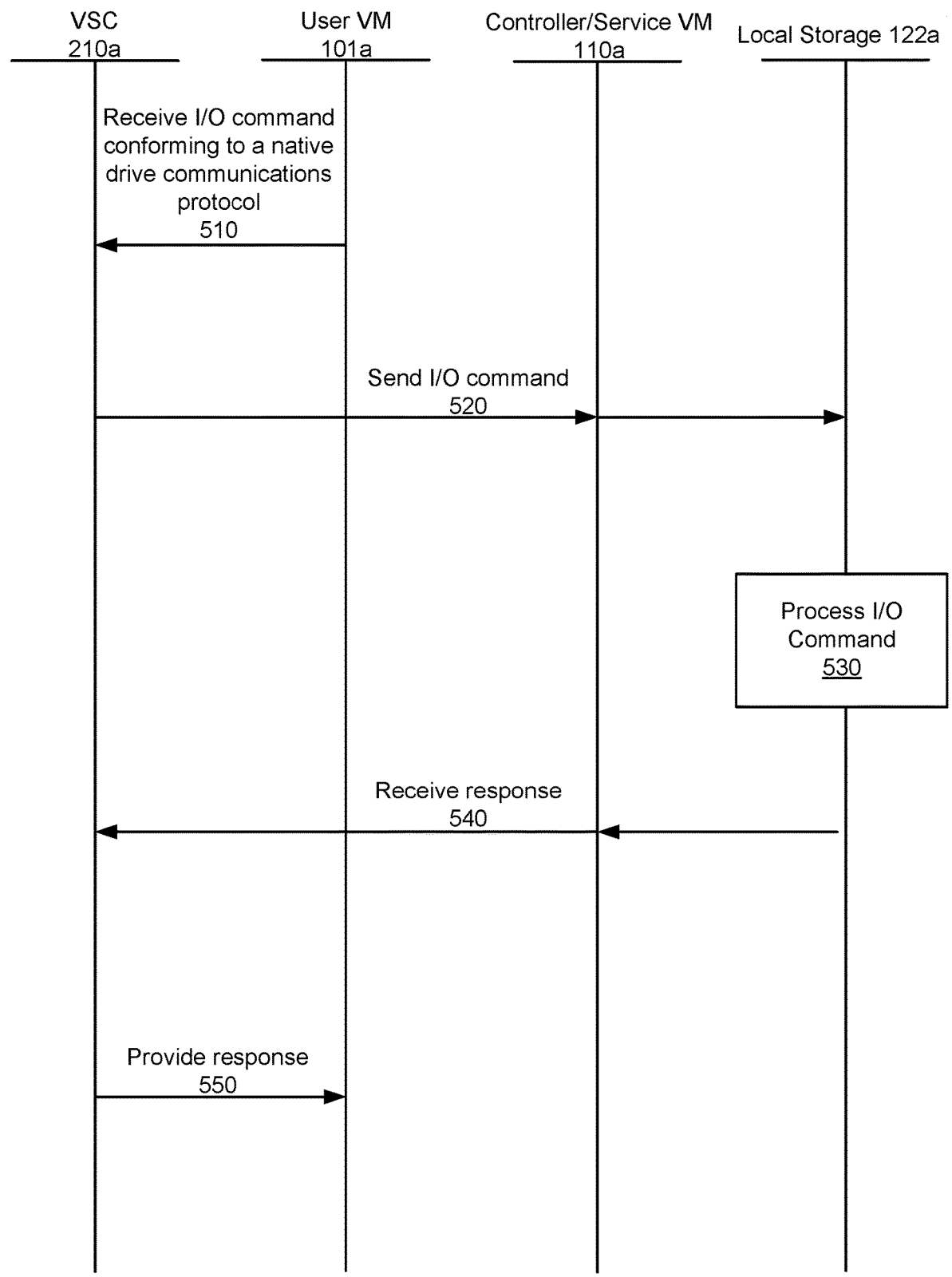
FIG. 5 illustrates an example method for connection management in a virtualization environment.

FIG. 5 illustrates an example method for connection management in a virtualization environment. In step 510, user VM 101a may send and VSC 210a may receive an I/O command conforming to a native drive communications protocol. As an example and not by way of limitation, local storage 122a may natively use the SCSI communications protocol and VM 101a may send a read command in the SCSI communications protocol to VSC 210a. In step 520, VSC 210a may send and local storage 122a may receive an I/O command corresponding to the I/O command sent from user VM 101a. In this example, VSC 210a may send a read command to a storage controller of local storage 122a. In some embodiments, VSC 210a may send the I/O command to local storage 122a through controller/service VM 110a. In step 530, local storage 122a may process the I/O command. In this example, local storage 122a may attempt to retrieve the data requested. In step 540, local storage 122a may send and VSC 210a may receive a response to the I/O command sent in step 520. In this example, the response may include the data requested, an error message that the data was not able to be retrieved, or any other appropriate response. In some embodiments, local storage 122a may send the response to VSC 210a through controller/service VM 110a. In step 550, VSC 210a may send and user VM 101a may receive a response. In this example, the response may include the data requested, an error message, or any other appropriate response.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for connection management including the particular steps of the method of FIG. 5, this disclosure contemplates any suitable method for connection management including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
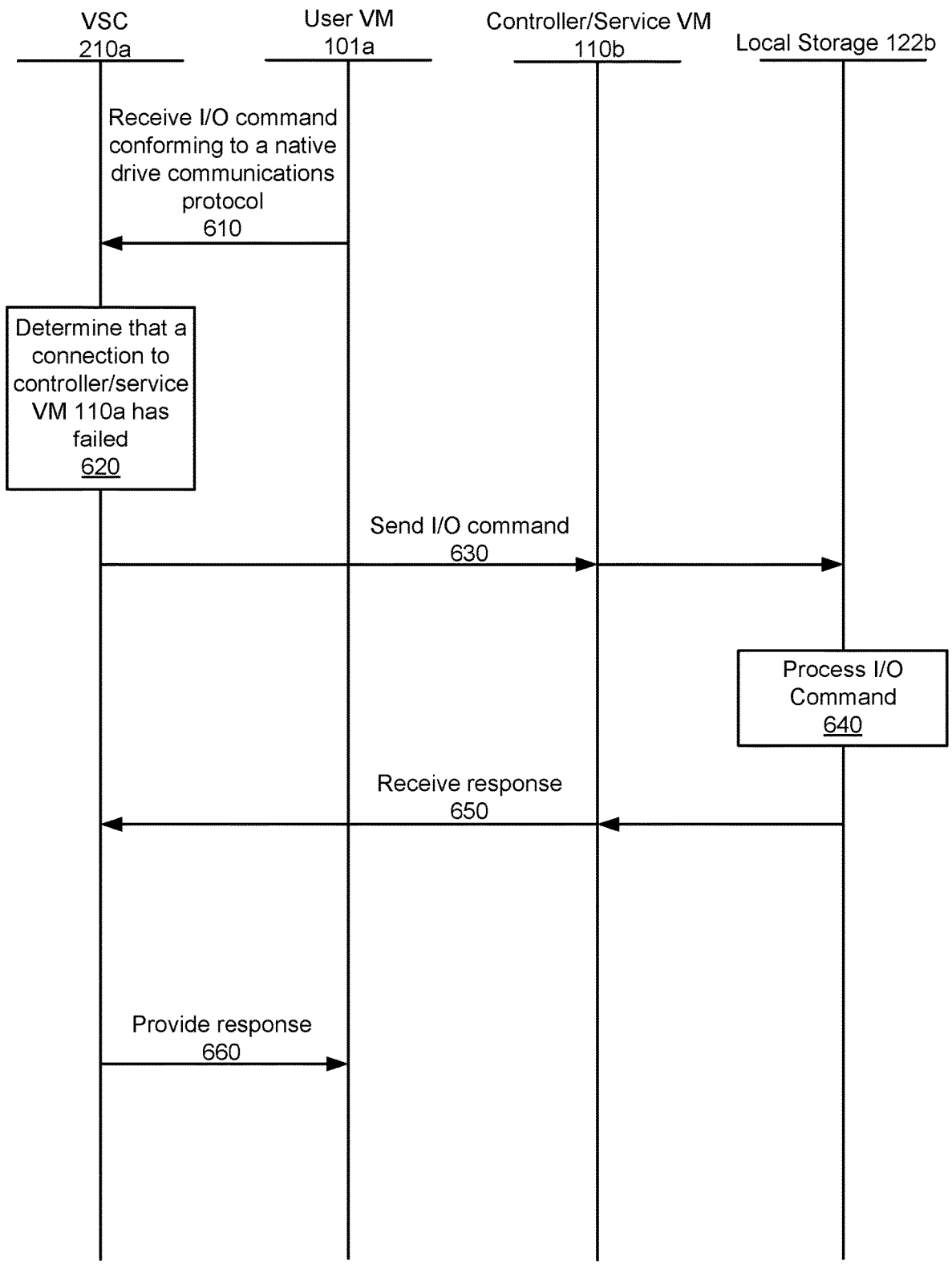
FIG. 6 illustrates an example method for connection management in an example virtualization environment in an example failover scenario.

FIG. 6 illustrates an example method for connection management in an example virtualization environment in an example failover scenario. In step 610, user VM 101a may send and VSC 210a may receive an I/O command conforming to a native drive communications protocol. As an example, VM 101a may send a read command in the SCSI communications protocol to VSC 210a. In step 620, VSC 210a may determine that a connected to local controller/service VM 110a has failed. For example, VSC 210a may ping controller/service VM 110a and controller/service VM 110a may fail to respond to the ping within a threshold amount of time. In step 630, VSC 210a may send and local storage 122b may receive an I/O command corresponding to the I/O command sent from user VM 101a. The I/O command may be translated into an IP-based storage communications protocol and sent via network 140. In some embodiments, VSC 210a may send the I/O command to local storage 122b through controller/service VM 110b via network 140. In step 640, local storage 122b may process the I/O command. In this example, local storage 122b may attempt to retrieve the data requested. In step 650, local storage 122b may send and VSC 210a may receive a response to the I/O command sent in step 630. In this example, the response may include the data requested, an error message that the data was not able to be retrieved, or any other appropriate response. In some embodiments, local storage 122b may send the response to VSC 210a through controller/service VM 110b via network 140. In step 660, VSC 210a may send and user VM 101a may receive a response. In this example, the response may include the data requested, an error message, or any other appropriate response.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for connection management including the particular steps of the method of FIG. 6, this disclosure contemplates any suitable method for connection management including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
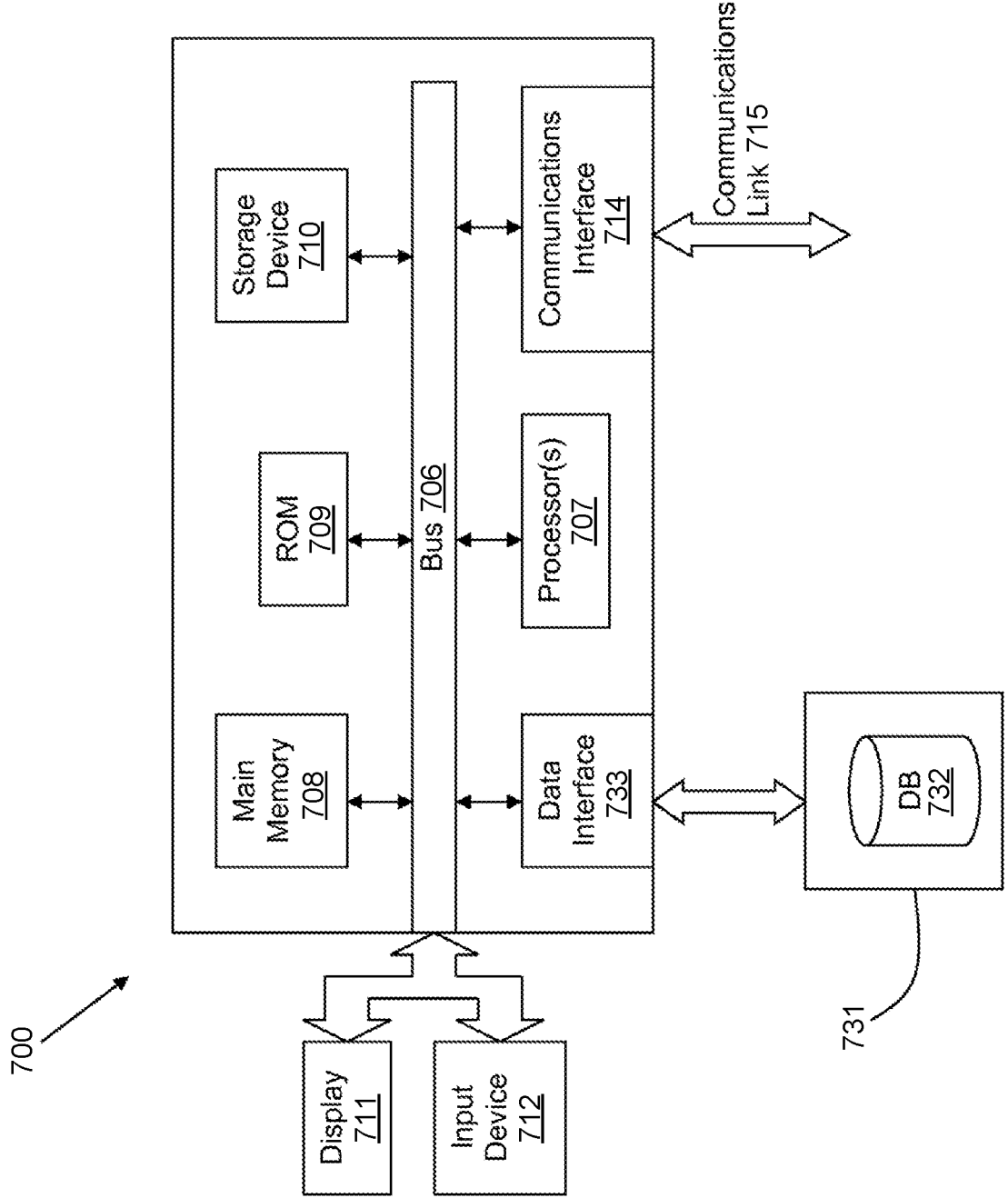
FIG. 7 illustrates a block diagram of a computing system suitable for implementing particular embodiments disclosed herein.

FIG. 7 is a block diagram of an illustrative computing system 700 suitable for implementing particular embodiments disclosed herein. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

Computer system 700 includes a bus 706 (e.g., an address bus and a data bus) or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), display 711 (e.g., CRT, LCD, LED), input device 712 (e.g., keyboard, keypad, mouse, microphone). In particular embodiments, computer system 700 may include one or more of any such components.

According to particular embodiments, computer system 700 performs specific operations by processor 707 executing one or more sequences of one or more instructions contained in system memory 708. Such instructions may be read into system memory 708 from another computer readable/usable medium, such as static storage device 709 or disk drive 710. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware.

The term "computer readable medium" or "computer usable medium" as used herein refers to any medium that participates in providing instructions to processor 707 for execution. Such a medium may take many forms, including but not limited to, nonvolatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions is performed by a single computer system 700. According to other embodiments, two or more computer systems 700 coupled by communication link 715 (e.g., LAN, PTSN, or wireless network) may perform the sequence of instructions in coordination with one another.

Computer system 700 may transmit and receive messages, data, and instructions, including program, i.e., application code, through communication link 715 and communication interface 714. Received program code may be executed by processor 707 as it is received, and/or stored in disk drive 710, or other non-volatile storage for later execution. A database 732 in a storage medium 731 may be used to store data accessible by the system 700 by way of data interface 733.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a virtual storage controller running on a host machine,
        receiving an input/output (I/O) command using a native drive communications protocol from a software application on a user virtual machine running on the host machine;
        determining whether a local service virtual machine on a same node as the virtual storage controller is unresponsive to the virtual storage controller by:
            pinging the local service virtual machine; and
            detecting whether the local service virtual machine fails to respond to the virtual storage controller within a pre-determined amount of time after pinging by the virtual storage controller;
        embedding an Internet Protocol (IP)-based storage communications protocol in the I/O command to create an embedded I/O command, in response to the local service virtual machine being unresponsive to the virtual storage controller;
        sending the embedded I/O command to a remote service virtual machine, wherein the remote service virtual machine is configured to send the embedded I/O command to a local storage and receive a response from the local storage; and
        receiving the response from the remote service virtual machine.

2. The method of claim 1, wherein the embedded I/O command comprises a read command, and wherein the response comprises an acknowledgement of a receipt of the embedded I/O command, a confirmation of a successful read operation, an error message, or data retrieval.

3. The method of claim 1, wherein the embedded I/O command comprises a write command, and wherein the response comprises an acknowledgement of a receipt of the embedded I/O command, a confirmation of a successful write operation, an error message, or data retrieval.

4. The method of claim 1, wherein the embedded I/O command is a command to test whether a storage device is ready, format the storage device, read block limits for the storage device, reassign blocks for the storage device, verify data, copy data, erase data, determine or retrieve diagnostic data for the storage device, verify data integrity via data on the storage device, retrieve information about the storage device, initiate repair, overwrite data, or encrypt data.

5. The method of claim 1, wherein the native drive communications protocol is a Small Computer System Interface (SCSI) protocol.

6. The method of claim 1, wherein the IP-based storage communications protocol is an Internet SCSI (iSCSI) protocol.

7. The method of claim 1, wherein receiving, by the virtual storage controller, the I/O command from the software application on the user virtual machine, is via a hypervisor.

8. The method of claim 1, wherein the software application is an operating system.

9. An apparatus comprising a processor having programmed instructions to:
    receive an input/output (I/O) command at a virtual storage controller from a software application on a single user virtual machine to:
    determine whether a first service virtual machine on a same node as the virtual storage controller is unresponsive to the apparatus;

ping the first service virtual machine;
detect whether the first service virtual machine fails to respond to the apparatus within a pre-determined amount of time after pinging by the apparatus;
embed an Internet Protocol (IP)-based storage communications protocol in the I/O command to create an embedded I/O command, in response to the first service virtual machine being unresponsive to the apparatus;
send the embedded I/O command to a second service virtual machine, wherein the second service virtual machine is configured to send the embedded I/O command to a second local storage and receive a response from the second local storage and
receive the response from the second service virtual machine.

10. The apparatus of claim 9, wherein the embedded I/O command comprises a read command, and wherein the response comprises an acknowledgement of a receipt of the embedded I/O command, a confirmation of a successful read operation, an error message, or data retrieval.

11. The apparatus of claim 9, wherein the embedded I/O command comprises a write command, and wherein the response comprises an acknowledgement of a receipt of the embedded I/O command, a confirmation of a successful write operation, an error message, or data retrieval.

12. The apparatus of claim 9, wherein the embedded I/O command is a command to test whether a storage device is ready, format the storage device, read block limits for the storage device, reassign blocks for the storage device, verify data, copy data, erase data, determine or retrieve diagnostic data for the storage device, verify data integrity via data on the storage device, retrieve information about the storage device, initiate repair, overwrite data, or encrypt data.

13. The apparatus of claim 9, wherein the native drive communications protocol is a Small Computer System Interface (SCSI) protocol.

14. The apparatus of claim 9, wherein the IP-based storage communications protocol is an Internet SCSI (iSCSI) protocol.

15. The apparatus of claim 9, the processor having further programmed instructions to receive the I/O command from the software application on the single user virtual machine via a first hypervisor.

16. The apparatus of claim 9, wherein the software application is an operating system.

17. A non-transitory computer-readable storage medium having instructions stored thereon that, upon execution by a computing device, causes the computing device to perform operations comprising:
receiving an I/O command using a native drive communications protocol from a software application on a user virtual machine running on a host machine having a virtual storage controller;
determining whether a local service virtual machine on a same node as the virtual storage controller is unresponsive to a virtual storage controller on the host machine by:
pinging the local service virtual machine; and
detecting whether the local service virtual machine has failed to respond to the virtual storage controller within a pre-determined amount of time after pinging by the virtual storage controller;
embedding an Internet Protocol (IP)-based storage communications protocol in the I/O command to create an embedded I/O command, in response to the local service virtual machine being unresponsive to the virtual storage controller;
sending the embedded I/O command to a remote service virtual machine, wherein the remote service virtual machine is configured to send the embedded I/O command to a local storage and receive a response from the local storage; and
receiving the response from the remote service virtual machine.

18. The storage medium of claim 17, wherein the embedded I/O command comprises a read command, and wherein the response comprises an acknowledgement of a receipt of the embedded I/O command, a confirmation of a successful read operation, an error message, or data retrieval.

19. The storage medium of claim 17, wherein the embedded I/O command comprises a write command, and wherein the response comprises an acknowledgement of a receipt of the embedded I/O command, a confirmation of a successful write operation, an error message, or data retrieval.

20. The storage medium of claim 17, wherein the embedded I/O command is a command to test whether a storage device is ready, format the storage device, read block limits for the storage device, reassign blocks for the storage device, verify data, copy data, erase data, determine or retrieve diagnostic data for the storage device, verify data integrity via data on the storage device, retrieve information about the storage device, initiate repair, overwrite data, or encrypt data.

21. The storage medium of claim 17, wherein the native drive communications protocol is a Small Computer System Interface (SCSI) protocol.

22. The storage medium of claim 17, wherein the IP-based storage communications protocol is an Internet SCSI (iSCSI) protocol.

23. The storage medium of claim 17, wherein receiving, by the virtual storage controller, the I/O command from the software application on the user virtual machine, is via a hypervisor.

24. The storage medium of claim 17, wherein the software application is an operating system.

* * * * *